(12) United States Patent
Sugioka et al.

(10) Patent No.: US 8,167,720 B2
(45) Date of Patent: May 1, 2012

(54) METHOD, APPARATUS, MEDIUM AND SYSTEM USING A CORRECTION ANGLE CALCULATED BASED ON A CALCULATED ANGLE CHANGE AND A PREVIOUS CORRECTION ANGLE

(75) Inventors: Taku Sugioka, Kyoto (JP); Kenta Sato, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1608 days.

(21) Appl. No.: 11/544,043

(22) Filed: Oct. 6, 2006

(65) Prior Publication Data
US 2007/0270219 A1 Nov. 22, 2007

(30) Foreign Application Priority Data
May 2, 2006 (JP) .................................. 2006-128218

(51) Int. Cl.
*A63F 9/00* (2006.01)
(52) U.S. Cl. ........................................................ 463/36
(58) Field of Classification Search .................... 463/36, 463/37
See application file for complete search history.

(56) References Cited

U.S. PATENT DOCUMENTS

| | | | |
|---|---|---|---|
| 4,839,838 A | 6/1989 | LaBiche et al. | |
| 5,059,958 A | 10/1991 | Jacobs et al. | |
| 5,128,671 A | 7/1992 | Thomas, Jr. | |
| 5,290,964 A * | 3/1994 | Hiyoshi et al. | 84/600 |
| 5,440,326 A | 8/1995 | Quinn | |
| 5,598,187 A | 1/1997 | Ide et al. | |
| 5,702,323 A | 12/1997 | Poulton | |
| 5,898,421 A | 4/1999 | Quinn | |
| 5,913,727 A | 6/1999 | Ahdoot | |
| 6,066,075 A | 5/2000 | Poulton | |
| 6,072,467 A | 6/2000 | Walker | |
| 6,201,554 B1 * | 3/2001 | Lands | 345/169 |
| 6,315,673 B1 | 11/2001 | Kopera et al. | |
| 6,375,572 B1 * | 4/2002 | Masuyama et al. | 463/43 |
| 6,545,661 B1 | 4/2003 | Goschy et al. | |

(Continued)

FOREIGN PATENT DOCUMENTS
EP 0 835 676 4/1998
(Continued)

OTHER PUBLICATIONS
Electronic Entertainment Expo (E3) advertisement for G-Force Tilt "TILTPAK Rumble & Motion Sensing Pak for Nintendo 64".
(Continued)

*Primary Examiner* — Melba Bumgarner
*Assistant Examiner* — Seng H Lim
(74) *Attorney, Agent, or Firm* — Nixon & Vanderhye P.C.

(57) ABSTRACT

A game apparatus includes a controller provided with an acceleration sensor for detecting accelerations on at least two axes orthogonal to each other. When playing a game, the controller is given a rotating operation so as to rotate around an axis orthogonal to the two axes. The accelerations on the two axes detected according to the rotating operation are converted into a point on a two-dimensional coordinate system. An angle of each converted point is calculated, and an angle change is also calculated. Based on the angle change corrected to change smoothly and a previous correction angle, a present correction angle is calculated. Game processing according to the correction angle is performed, and a game object is moved by an amount corresponding to the correction angle, for example.

20 Claims, 10 Drawing Sheets

U.S. PATENT DOCUMENTS

| | | | |
|---|---|---|---|
| 6,669,563 B1* | 12/2003 | Kitami et al. | 463/36 |
| 6,759,583 B2* | 7/2004 | Mizuno et al. | 84/422.4 |
| 6,908,386 B2* | 6/2005 | Suzuki et al. | 463/30 |
| 6,908,388 B2* | 6/2005 | Shimizu et al. | 463/31 |
| 7,094,147 B2 | 8/2006 | Nakata et al. | |
| 7,169,998 B2* | 1/2007 | Kondo et al. | 84/615 |
| 7,491,879 B2* | 2/2009 | Hikino et al. | 84/615 |
| 2001/0014616 A1* | 8/2001 | Matsuda et al. | 455/567 |
| 2003/0216176 A1 | 11/2003 | Shimizu et al. | |
| 2003/0216179 A1* | 11/2003 | Suzuki et al. | 463/35 |
| 2004/0011189 A1 | 1/2004 | Ishida et al. | |
| 2004/0176025 A1* | 9/2004 | Holm et al. | 455/3.06 |
| 2005/0119036 A1 | 6/2005 | Albanna et al. | |
| 2005/0210418 A1 | 9/2005 | Marvit et al. | |
| 2006/0025218 A1 | 2/2006 | Hotta | |
| 2006/0283233 A1* | 12/2006 | Cordani | 73/12.01 |
| 2007/0137462 A1* | 6/2007 | Barros et al. | 84/453 |
| 2007/0255434 A1* | 11/2007 | Inagaki | 700/94 |
| 2007/0256546 A1* | 11/2007 | Hikino et al. | 84/615 |
| 2007/0265104 A1* | 11/2007 | Haga et al. | 473/37 |

FOREIGN PATENT DOCUMENTS

| | | |
|---|---|---|
| JP | 62-143124 | 6/1987 |
| JP | 10-214155 | 8/1998 |
| JP | 2000-308756 | 11/2000 |
| JP | 2005-000471 | 1/2005 |

OTHER PUBLICATIONS

Electronic Entertainment Expo (E3) advertisement for G-Force Tilt "TILTFORCE$^2$ Motion-Sensing & Vibration Controller for Playstation Game Console".

News Article "New Game Controllers Using Analog Devices' G-Force Tilt to be Featured at E3", Norwood, MA (May 10, 1999).

Youtube video: "Nintendo Wii Controller Invented by Americans" http://www.youtube.com/watch?v=wjLhSrSxFNw, Jun. 28, 2000.

Youtube Fox News Video: "Interview with Pat Goschy, the "Real" Nintendo Wii Inventor" http://www.youtube.com/watch?v=oKtZysYGDLE.

\* cited by examiner (A)

(B)

ANGLE CHANGE: $V_n = \theta_n - \theta_{n-1}$

ANGLE CHANGE IN VIEW OF STOP: $T = \begin{cases} V_n & \text{(IF PRESCRIBED ROTATING OPERATION IS PERFORMED)} \\ 0 & \text{(OTHER CASES)} \end{cases}$ CORRECTED ANGLE CHANGE: $T' = T' + (T - T' * \text{CONSTANT})$

CORRECTION ANGLE: $V = V + T'$

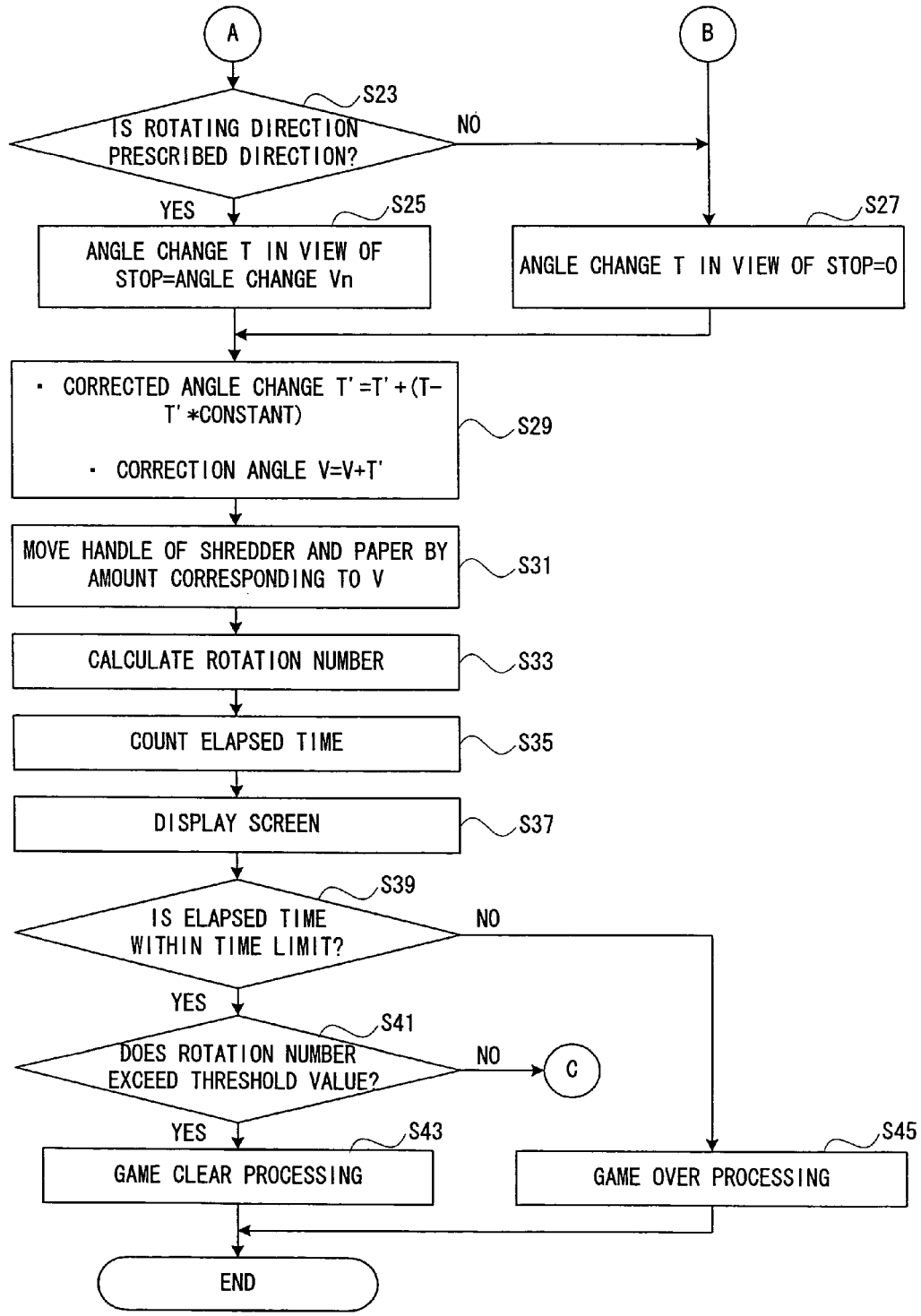

METHOD, APPARATUS, MEDIUM AND SYSTEM USING A CORRECTION ANGLE CALCULATED BASED ON A CALCULATED ANGLE CHANGE AND A PREVIOUS CORRECTION ANGLE

CROSS REFERENCE OF RELATED APPLICATION

The disclosure of Japanese Patent Application No. 2006-128218 is incorporated herein by reference.

BACKGROUND

1. Field

Example embodiments of the present invention relate to a storage medium storing a game program, a game apparatus and a game control method. More specifically, example embodiments of the present invention relates to a storage medium storing a game program, a game apparatus and a game control method, for a game to be played by a rotating operation to move a game controller, including an acceleration sensor having at least two axes orthogonal to each other, around an axis further orthogonal to the two axes.

2. Description of the Related Art

In recent years, it has been well known that a game is played with a game controller having an acceleration sensor. Examples of related art are disclosed in Document 1 (Japanese Patent Laid-Open Publication No. 2005-471) and Document 2 (Japanese Patent Laid-Open Publication No. 10-214155). In the art disclosed in Document 1, a typical game controller is provided with a biaxial acceleration sensor, and a game is played by detecting an inclination of the controller.

Further, in the art disclosed in Document 2, an acceleration sensor is provided inside a controller formed in a shape simulating a tool such as a fishing gear, and a game is played by detecting an intensity or inclination of a swing movement of the controller.

However, Document 1 only discloses that the biaxial acceleration sensor is arranged horizontally and the inclination of the controller is detected by detecting a rotational angle around the two axes, so it only enables operation to tilt or change the direction by holding the controller with both hands, based on an operating mode having been adopted for a long time. Therefore, the art cannot provide a game having an operating environment largely different from a conventional one.

Further, the art disclosed in Document 2 can provide a virtual game involving a swing movement which has been known recently. However, it cannot provide a game having a new bodily sensation to be played by a form to rotationally operate the game controller itself.

SUMMARY

It is therefore one aspect of example embodiments of the present invention to provide a novel storage medium storing a game program, game apparatus and game control method.

It is another aspect of example embodiments of the present invention to provide a storage medium storing a game program, a game apparatus and a game control method, capable of providing a new bodily sensation to a player operating a game controller by means of an unconventional method.

It is still another aspect of example embodiments of the present invention to provide a storage medium storing a game program, a game apparatus and a game control method, capable of realizing a game involving unconventional amusement by performing game processing according to an operation to move a game controller around a prescribed axis.

A storage medium storing a game program of a first example embodiment of the invention is a storage medium storing a game program for performing game processing, in a game apparatus having an operation means including an acceleration sensor for detecting accelerations on at least two axes orthogonal to each other, according to a rotating operation to move the operation means around an axis orthogonal to the two axes. The game program in the storage medium causes a processor of the game apparatus to perform an obtaining step, a conversion step, an angle calculation step, an angle change calculation step, an angle correction step and a game processing step. In the obtaining step, accelerations on the two axes detected by the acceleration sensor are obtained. In the conversion step, the accelerations on the two axes are converted into a point on a two-dimensional coordinate system. In the angle calculation step, an angle defined by a line connecting the converted point with a reference point, and a reference direction is calculated. In the angle change calculation step, an angle change between the present angle calculated in the angle calculation step and a previous angle is calculated. In the angle correction step, a correction angle is calculated based on the angle change calculated in the angle change calculation step and a previous correction angle. In the game processing step, game processing is performed based on the correction angle calculated in the angle correction step.

Specifically, the game program stored on the storage medium causes a processor (26: a reference numeral corresponding to that in the embodiments described below. The same applies to following numerals) of a game apparatus (12) to perform respective steps described below. Note that the game apparatus includes an operation means (14) having an acceleration sensor (60) which detects accelerations on at least two axes orthogonal to each other. The game program is a program for performing game processing according to a rotating operation to move the operation means around an axis (70) orthogonal to the two axes. In an obtaining step (S3), accelerations on the two axes detected by the acceleration sensor are obtained. In a conversion step (S5), the accelerations on the two axes are converted into a point in which the accelerations serve as components (coordinates) of respective axes of a two-dimensional coordinate system (xy coordinate system). In the rotating operation, since rotation is performed in a plane defined by the two axes, acceleration caused by a centrifugal force is detected. Therefore, a locus of the converted point draws an orbit like a rotational movement, and shows a state of rotating operation. In an angle calculation step (S7), an angle defined by a line connecting the converted point with a reference point (e.g., origin of the two-dimensional coordinate system) and a reference direction (e.g., x axis) is calculated. In an angle change calculation step (S11), an angle change (Vn) between the angle calculated at present and an angle previously calculated is calculated. In an angle correction step (S29), a present correction angle (V) is calculated based on the angle change calculated at present and the previous correction angle. Note that an angle change used in calculating the correction angle is corrected as required. For example, if it is determined that a prescribed rotating operation is performed, the calculated angle change is used, and if not, it is corrected to zero. Further, an angle change (T') in which the angle change (T) is corrected to change smoothly is calculated. The correction angle is calculated based on the corrected angle change and the previous correction angle (according to Equation 2 in the embodiment). Since the correction angle is calculated while taking the previous correction angle into account for the angle change as well, it is possible to reflect the state of rotating operation on the game processing appropriately and smoothly by using such a correction angle. In the game processing step (S31, S33, S37), game processing is performed based on the correction angle, and movement of the object is controlled by an amount corresponding to the correction angle.

As described above, by calculating the angle change of a point in which accelerations of two axes serve as components, a rotating state by the rotating operation of the operation means is detected and used for game processing. Therefore, since game processing is performed according to the rotating operation of the operation means, it is possible to realize and provide a game involving unconventional amusement. Further, since the operation means is operated in a rotating manner, it is possible to provide a game enabling a player to experience new bodily sensation.

In one aspect, the game program further causes the processor to perform a rotating direction determination step of determining whether or not a rotating direction is the same as a past one, based on the angle change calculated in the angle calculation step. If the rotating direction is determined as not the same one in the rotating direction determination step, the correction angle is calculated on a supposition that the angle change is zero, in the angle correction step.

That is, in the rotating direction determination step (S17, S19), it is determined whether or not the rotating direction is the same as the past one based on the angle change. In the angle correction step (S27, S29), if the rotating direction is determined as not the same one, the correction angle is calculated on a supposition that the angle change is zero. Therefore, when the rotating operation in the same direction is not performed, the rotating operation is not to be reflected on game processing. In other words, when a rotating operation is performed in a direction same as the past one, the rotating operation is to be reflected on game processing. Since the game proceeds not by simply performing the rotating operation but by keeping the rotating operation in the same direction, amusement can be enhanced.

In another embodiment, the game processing step includes a display control step for displaying an object moved based on the correction angle on a display means.

That is, in the display control step (S31, S37), the object (80, 82) in which movement is controlled based on the correction angle is displayed on a display means (16). Therefore, since the object on a screen moves according to the rotating operation, it is possible to realize a game with more amusement.

In another embodiment, the game processing step includes a game clear determination step of determining whether or not a game clear condition is satisfied based on the correction angle.

That is, in the game clear determination step (S39, S41), it is determined whether or not the game clear condition is satisfied based on the correction angle. Therefore, it is possible to realize a game involving excellent amusement such that the game may be cleared or not depending on the rotating operation.

In another embodiment, the game processing step includes a rotation number calculation step of calculating a rotation number of the rotating operation based on the correction angle, and the game clear determination step determines whether or not the rotation number reaches a prescribed threshold or more within a time limit, as the game clear condition.

That is, in a rotation number calculation step (S33), the rotation number of the rotating operation is calculated based on the correction angle. In the game clear determination step, it is determined whether or not the rotation number reaches the prescribed threshold or more within the time limit, as the game clear condition. Therefore, since a prescribed rotating operation is required to be performed within the time limit, it is possible to realize a game with more amusement.

A game apparatus of a second example embodiment of the invention is a game apparatus for performing game processing, having an operation means including an acceleration sensor for detecting accelerations on at least two axes orthogonal to each other, according to a rotating operation to move the operation means around an axis orthogonal to the two axes. The game apparatus comprises an obtaining means, a conversion means, an angle calculation means, an angle change calculation means, an angle correction means, and a game processing means. The obtaining means obtains accelerations on the two axes detected by the acceleration sensor. The conversion means converts the accelerations on the two axes into a point on a two-dimensional coordinate system. The angle calculation means calculates an angle defined by a line connecting the converted point with a reference point, and a reference direction. The angle change calculation means calculates an angle change between the present angle calculated by the angle calculation means and the previous angle. The angle correction means calculates a correction angle based on the angle change calculated by the angle change calculation means and the previous correction angle. The game processing means performs game processing based on the correction angle calculated by the angle correction means.

The second example embodiment of the invention is the game apparatus corresponding to the game program of the first example embodiment of the invention, exhibiting the same effect as that of the first example embodiment of the invention.

A game control method of a third example embodiment of the invention is a game control method for performing game processing, in a game apparatus having an operation means including an acceleration sensor for detecting accelerations on at least two axes orthogonal to each other, according to a rotating operation to move the operation means around an axis orthogonal to the two axes. The game control method includes an obtaining step, a conversion step, an angle calculation step, an angle change calculation step, an angle correction step and a game processing step. In the obtaining step, accelerations on two axes detected by the acceleration sensor are obtained. In the conversion step, the accelerations on the two axes are converted into a point on a two-dimensional coordinate system. In the angle calculation step, an angle defined by a line connecting the converted point with a reference point, and a reference direction is calculated. In the angle change calculation step, an angle change between the present angle calculated in the angle calculation step and the previous angle is calculated. In the angle correction step, a correction angle is calculated based on the angle change calculated in the angle change calculation step and the previous correction angle. In the game processing step, game processing is performed based on the correction angle calculated in the angle correction step.

The third example embodiment of the invention is the game control method equivalent to the first and the second example embodiments of the inventions, exhibiting the same effects as those of the first and second example embodiments of the inventions described above.

According to this example embodiment of the invention, accelerations on two axes detected by an acceleration sensor provided in an operation means are converted into a point on a two-dimensional coordinate system, and a correction angle is calculated from an angle change of the point, whereby game processing is performed based on the correction angle. Therefore, since game processing can be performed according to a detected state of rotating operation of the operation means, it is possible to realize a game involving unconventional amusement. Further, since the game can be played by unconventional operating method to rotate the operation means, it is possible to give a new sensory experience to the player.

The above described features, aspects and advantages of the example embodiments of the present invention will become more apparent from the following detailed description of the example embodiments of the present invention when taken in conjunction with the accompanying drawings.

BRIEF DESCRIPTION OF THE DRAWINGS

FIG. 3 is an illustrative view showing an example of a controller in FIG. 1, in which FIG. 3(A) is an oblique perspective view seen from the upper rear side, and FIG. 3(B) is an oblique perspective view seen from the lower rear side;

FIG. 11 is a flowchart showing the continuation of FIG. 10.

DETAILED DESCRIPTION OF NON-LIMITING, EXAMPLE EMBODIMENTS

Figure 1:
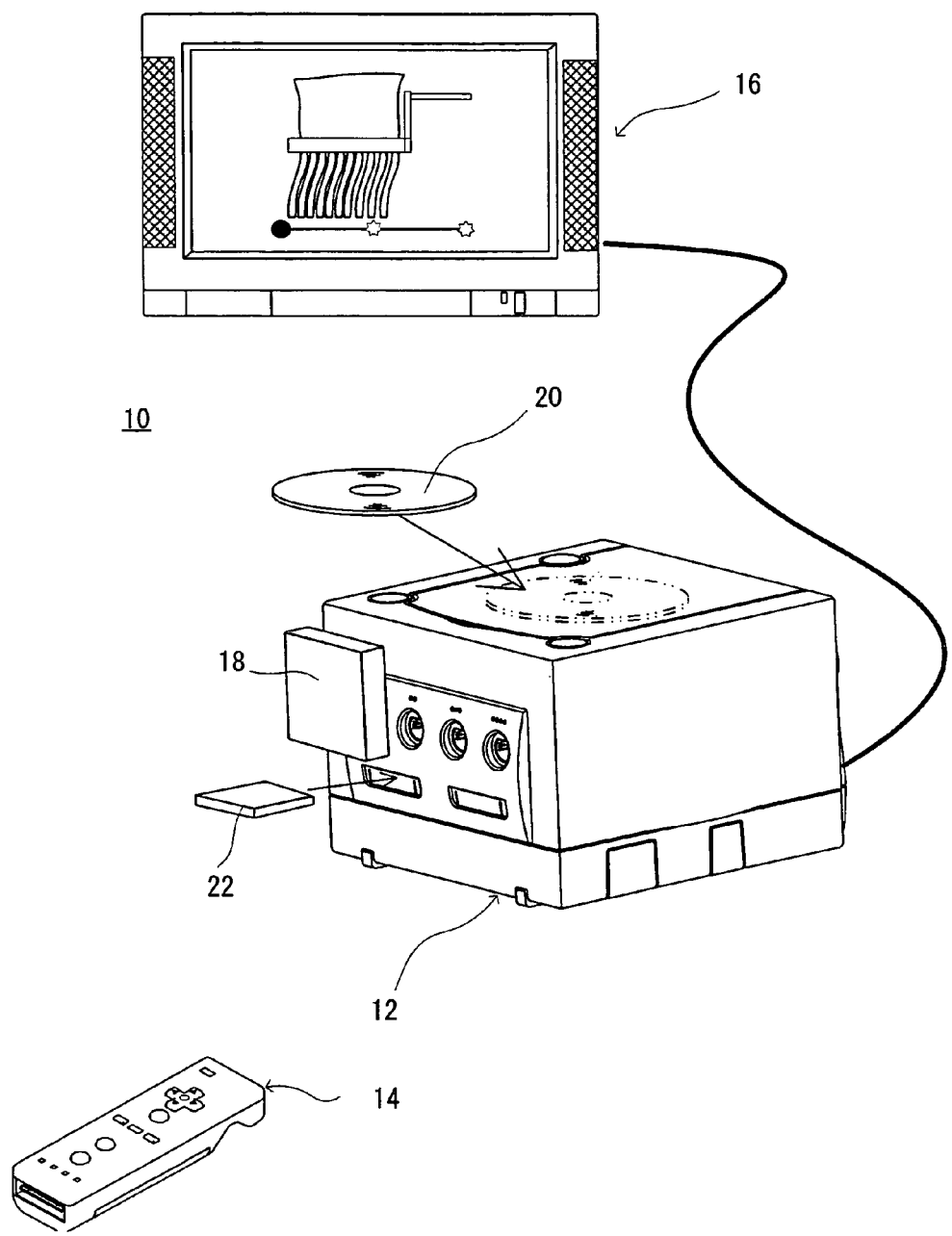
FIG. 1 is an external view showing an example of a game system of an example embodiment according to the present invention.

Referring to FIG. 1, a game system 10 of this embodiment includes a game apparatus 12 and a controller 14. The game apparatus 12 is a game console to be connected to a display or a monitor 16 such as a home TV receiver via a cable. The controller 14 is an operation device to be operated by a player or a user, providing operation data to the game apparatus 12.

The game apparatus 12 is connected with a receiving unit 18 via a connection terminal. The receiving unit 18 receives operation data wirelessly transmitted from the controller 14. Specifically, the controller 14 transmits operation data to the game apparatus 12 connected with the receiving unit 18, by using a wireless communication technique such as the Bluetooth (registered trademark).

Further, in the game apparatus 12, an optical disc 20, which is an example of an information storage medium used interchangeably in the game apparatus 12, is loaded or removed. The top main surface of the game apparatus 12 is provided with an ON/OFF switch for the power of the game apparatus 12, a reset switch for game processing, and an OPEN switch to open the top lid of the game apparatus 12. When a player presses the OPEN switch, the lid is opened, whereby the optical disc 20 can be loaded or removed. Further, the game apparatus 12 is provided with an external memory card 22 in an attachable/detachable manner as needed. A flash memory or the like mounted in the memory card 22 stores saved data and the like.

In the game apparatus 12, when a game program stored on the optical disc 20 is performed, the result is displayed on the monitor 16 as a game image. Note that the game apparatus 12 is also capable of displaying a game image on the monitor 16 by reproducing the game state previously performed, by using saved data stored on the external memory card 22. Further, from a speaker 24 (see FIG. 2) provided to the monitor 16, a game sound is outputted. The player operates the controller 14 to play a virtual game.

Figure 2:
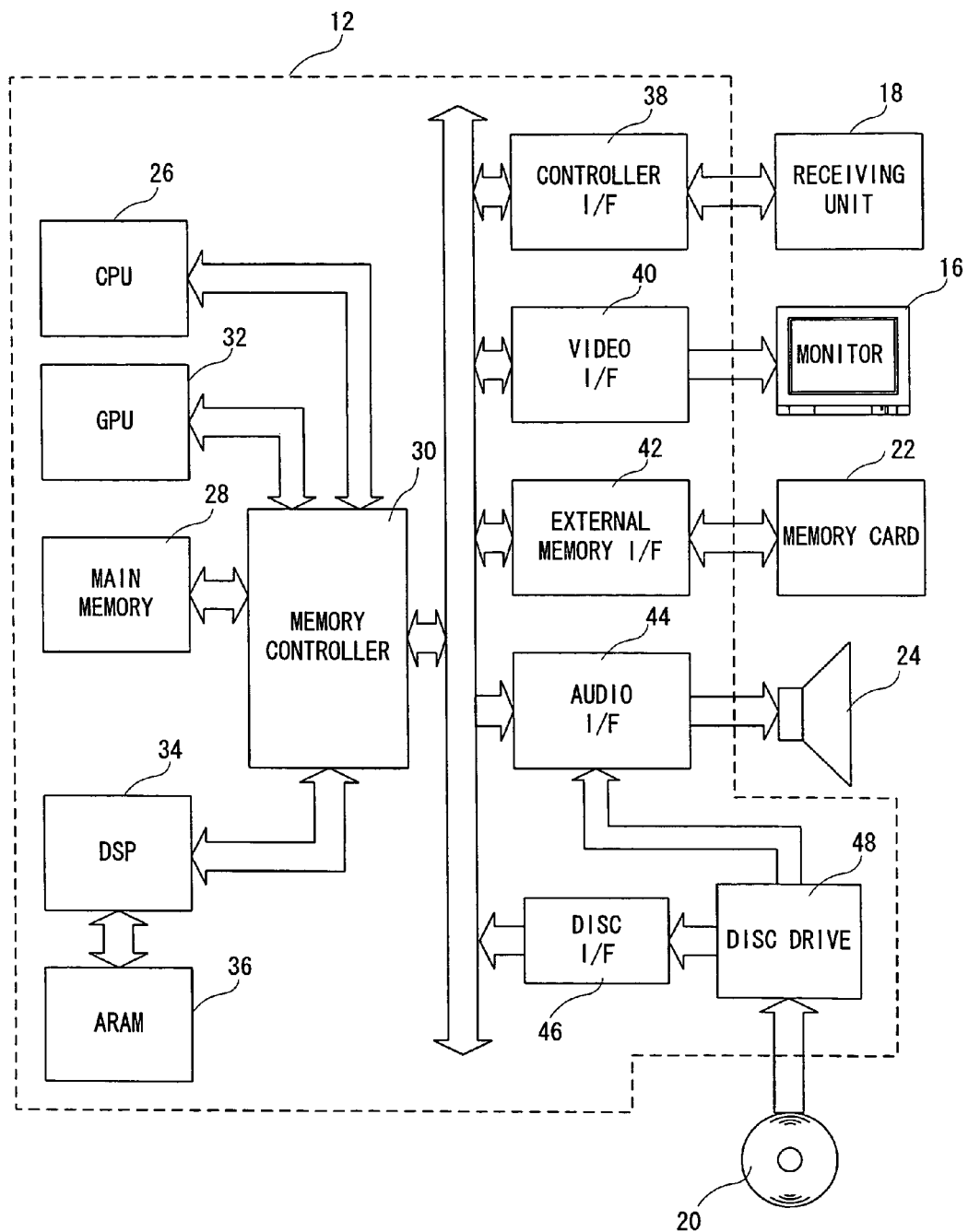
FIG. 2 is a block diagram showing an example of an electric configuration of the game apparatus in FIG. 1.

FIG. 2 shows an example of the electric configuration of the game apparatus 12. The game apparatus 12 includes a RISC CPU (Central Processing Unit) 26, for example, which performs various programs. The CPU 26 performs an activation program stored on a boot ROM not shown, and after performing initialization and the like of a memory such as a main memory 28, the CPU 26 loads a game program and data stored on the optical disc 20 to thereby perform game processing in accordance with the game program.

The CPU 26 is connected via a memory controller 30 with a GPU (Graphics Processing Unit) 32, the main memory 28, a DSP (Digital Signal Processor) 34 and an ARAM (Audio RAM) 36. Further, the memory controller 30 is connected with, via prescribed bus, a controller I/F (interface) 38, a video I/F 40, an external memory I/F 42, an audio I/F 44 and a disc I/F 46, which are connected with the receiving unit 18, the monitor 16, the external memory card 22, the speaker 24 and a disc drive 48, respectively.

The GPU 32 performs image processing according to an instruction of the CPU 26. The GPU 32 consists of a semiconductor chip for performing calculation processing required to display 3D graphics, for example. The GPU 32 performs image processing by using a memory exclusive for image processing not shown, or a storage area which is a part of the main memory 28. The GPU 32 generates game image data or movie pictures to be displayed, and outputs them to the monitor 16 via the memory controller 30 and the video I/F 40 appropriately.

The main memory 28 is a storage area used by the CPU 26, and stores game programs and data required for processing by the CPU 26 appropriately. For example, the main memory 28 stores game programs, various data and the like read out from the optical disc 20 by the CPU 26.

The DSP 34 serves as a sound processor, and is connected with the ARAM 36 for storing sound data and the like. The ARAM 36 is used when the DSP 34 performs prescribed processing (e.g., storing game programs and sound data previously read). The DSP 34 reads out sound data (sound waveform data) stored on the ARAM 36, generates data for sound output based on sound control data from the CPU 26, the sound waveform data and the like, and outputs sound from the speaker 24 provided to the monitor 16 via the memory controller 30 and the audio I/F 44.

The memory controller 30 controls data transfer comprehensively, and is connected with the respective I/Fs mentioned above. The controller I/F 38 consists of four controller I/Fs for example, and connects external equipment and the game apparatus 12 via connectors held by them. For example, the receiving unit 18 is fitted with the connecter, and is connected with the game apparatus 12 via the controller I/F 38. As described above, the receiving unit 18 receives operation data from the controller 14, and outputs the operation data to the CPU 26 via the controller I/F 38. Note that in another embodiment, the game apparatus 12 may include a receiving module therein which receives operation data transmitted from the controller 14, instead of the receiving unit 18. In this case, transmission data received by the receiving module is outputted to the CPU 26 via prescribed bus.

The video I/F 40 is connected with the monitor 16 on which a game image is displayed by image signals from the video I/F 40. The external memory I/F 42 is connected with the external memory card 22, and the CPU 26 accesses a flash memory and the like provided in the external memory card 22 via the memory controller 30.

The audio I/F 44 is connected with the speaker 24 incorporated in the monitor 16. The audio I/F 44 gives audio signals corresponding to sound data read out from the ARAM 36 or generated by the DSP 34 and sound data directly outputted from the disc drive 48 to the speaker 24, and the speaker 24 outputs the sound.

The disc I/F 46 is connected with the disc drive 48. The disc drive 48 reads out data stored on the optical disc 20 arranged at a prescribed readout position. The read out data is written on the main memory 28 via the disc I/F 46, the main controller 30, and the like, or is outputted to the audio I/F 44.

Figure 3:
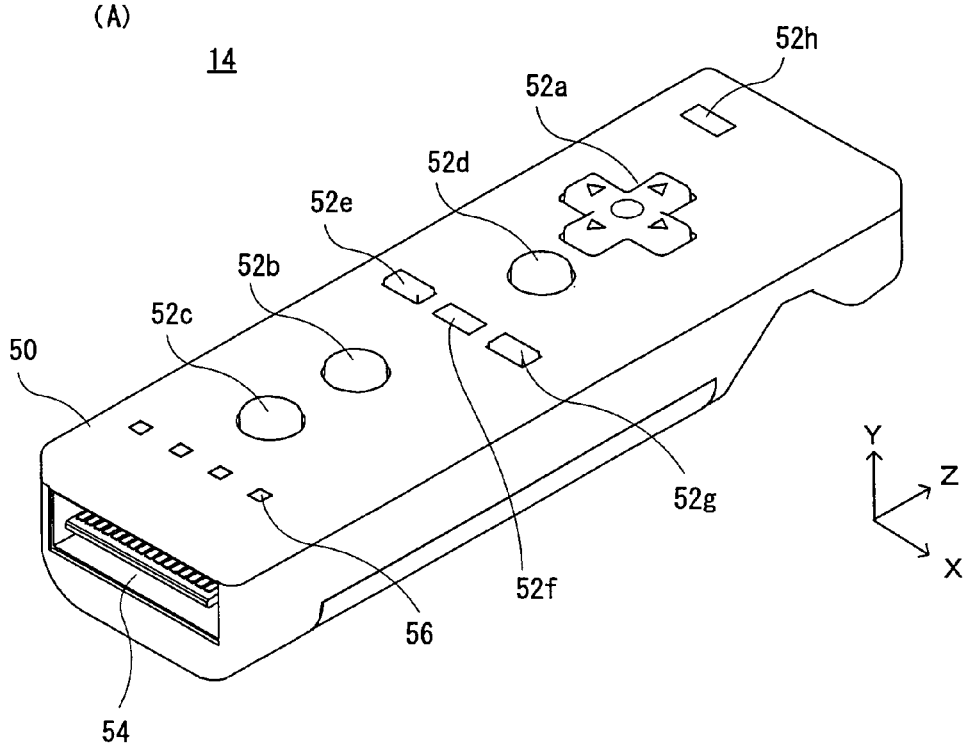
Figure 3:
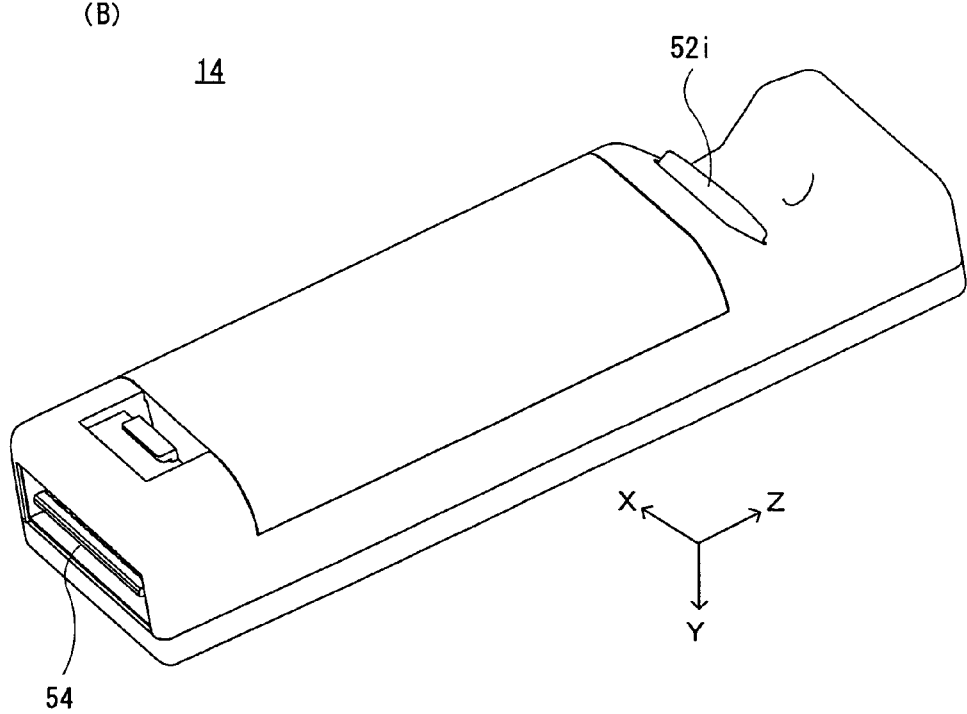

FIG. 3 shows an exemplary outside appearance of the controller 14. FIG. 3(A) is an oblique perspective view of the controller 14 seen from the upper rear side, and FIG. 3(B) is an oblique perspective view of the controller 14 seen from the lower rear side.

The controller 14 includes a housing 50 formed by plastic molding for example. The housing 50 is in an almost rectangular parallelepiped shape in which the front and back direction (Z axial direction shown in FIG. 3) is the longitudinal direction, having a size capable of being held by a hand of an adult or a child as a whole. As an example, the housing 50 is in a size with a length or a width almost the same as a palm of a human. A player can operate a game using the controller 14 by performing a game operation to press a button provided thereto and by changing the position or direction of the controller 14 itself. For example, in one game, a player can cause an object to be operated to perform a moving action by rotating the controller 14 with the longitudinal direction being the axis thereof.

The housing 50 is provided with a plurality of operating buttons. On the top surface of the housing 50, a cross key 52a, an X button 52b, a Y button 52c, an A button 52d, a select switch 52e, a menu switch 52f and a start switch 52g are provided. On the other hand, in the lower surface of the housing 50, a recess is formed, and a B button 52i is provided on the inclined plane on the rear surface side of the recess. To the respective buttons (switches) 52, respective functions are allocated according to the game program to be performed by the game apparatus 12. Further, on the top surface of the housing 50, a power supply switch 52h for turning on/off the power supply of the body of the game apparatus 12 from a remote distance.

Further, the rear surface of the housing 50 is provided with a connecter 54. The connecter 54 is an edge connecter of 32 pins, used to connect other equipment to the controller 14. Further, the rear surface side of the top surface of the housing 50 is provided with a plurality of LEDs 56. To the controller 14, a controller type (number) is allocated to discriminate it from other controllers 14. When operation data is transmitted from the controller 14 to the game apparatus 12, one LED 56 corresponding to the controller type currently set to the controller 14 lights up.

Figure 4:
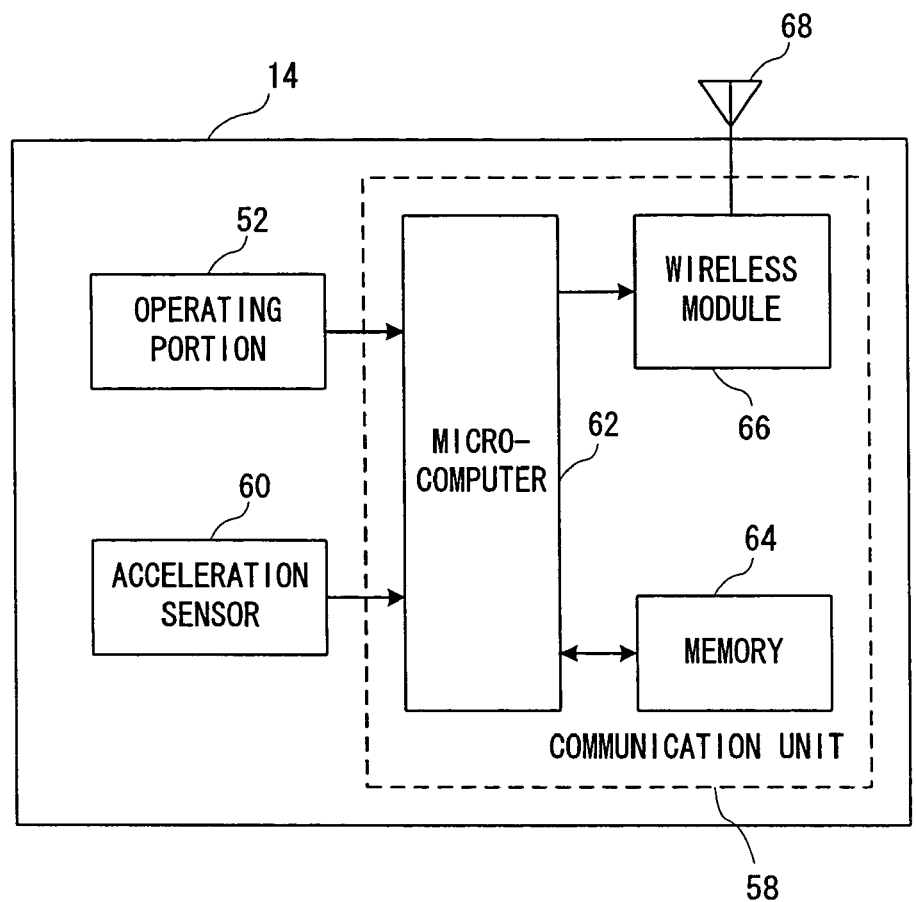
FIG. 4 is a block diagram showing an example of an electric configuration of the controller in FIG. 1.

FIG. 4 shows the electric configuration of the controller 14. The controller 14 includes a communication unit 58 and an acceleration sensor 60 therein, in addition to the operating portion 52 (respective operation buttons 52a to 52h).

The acceleration sensor 60 detects acceleration on a linear component and gravity acceleration for each sensing axis, among accelerations applied to the detection part of the acceleration sensor. The acceleration sensor 60 detects accelerations on at least two axial directions orthogonal to each other. For example, in the case of an acceleration sensor of two axes or three axes, an acceleration applied to the detection part of the acceleration sensor is detected as acceleration on a linear component along each axis. Specifically, in this embodiment, three-axial acceleration sensor is applied, and acceleration is detected by the three axes of the up and down direction (Y axial direction shown in FIG. 3), the left and right direction (X axial direction shown in FIG. 3), and the front and back direction (Z axial direction shown in FIG. 3), respectively. Further, by performing prescribed computation processing to the acceleration detected for each axis of the acceleration sensor 60, it is possible to calculate inclination and rotation of the controller 14. For example, if the acceleration sensor 60 is in a stationary state, gravity acceleration is always applied, so acceleration corresponding to the inclination of each axis with respect to the gravity acceleration is detected for each axis. Specifically, when the acceleration sensor 60 remains stationary in a horizontal state, gravity acceleration of 1G is applied to the Y axis of the acceleration sensor, so gravity acceleration on the other axes becomes almost 0. Then, when the posture of the acceleration sensor 60 is inclined from the horizontal state, the gravity acceleration is distributed to the respective axes of the acceleration sensor 60 according to the angles between the respective axial directions of the acceleration sensor 60 and the gravity direction. At this time, acceleration values of the respective axes of the acceleration sensor 60 are detected. By adding acceleration values of the respective axes to the computation, it is possible to calculate the posture of the acceleration sensor 60 with respect to the gravity direction.

Figure 5:
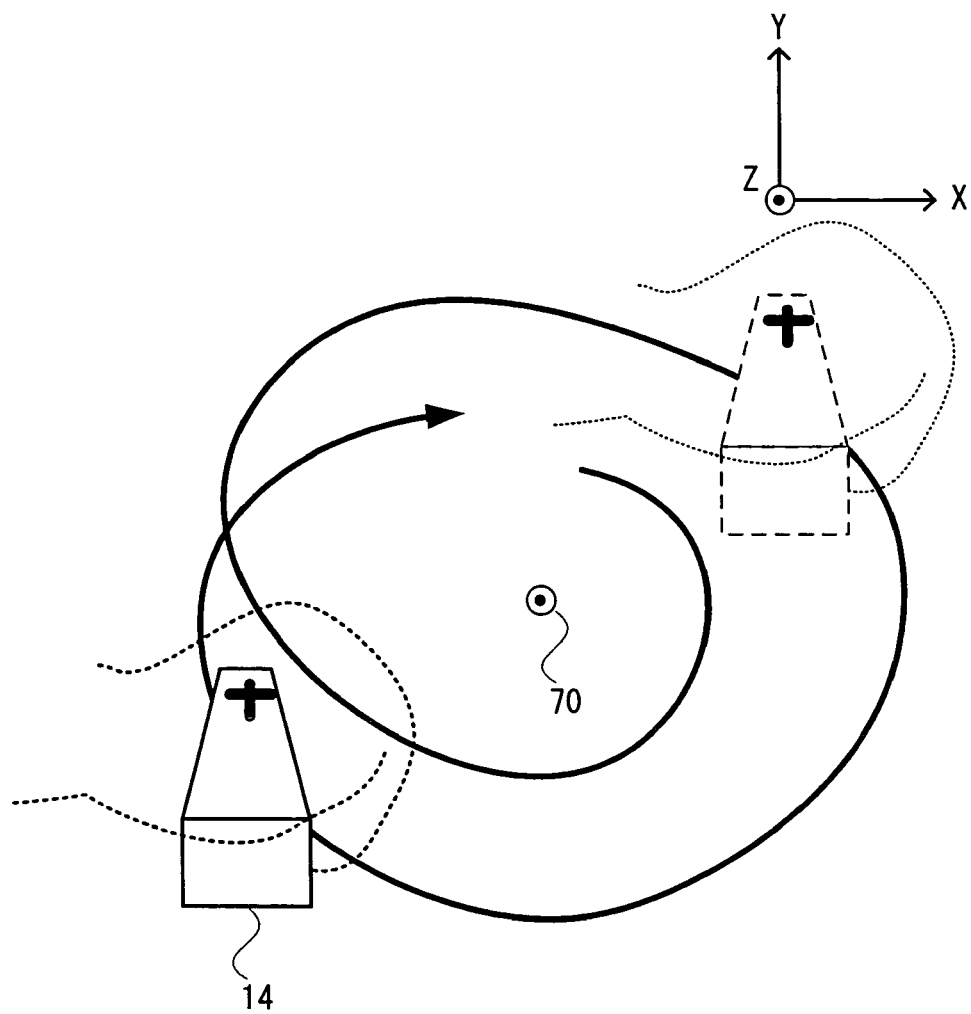
FIG. 5 is an illustrative view showing a method of a rotating operation of the controller.

As the acceleration sensor 60, a biaxial acceleration sensor in which acceleration is detected by the two axes of combination of any two from among the up and down direction, left and right direction and the front and back direction, depending on the type of required operation signals, may be used. In this embodiment, an operating state such as a rotating operation by the user to the controller 14 is detected by the acceleration sensor 60. In the game played in this embodiment, a user holds the controller 14 in a state that the longitudinal direction (Z axial direction) of the housing 50 is in an almost horizontal direction, and moves the arms so as to move the controller 14 about the Z axial direction, as shown in FIG. 5 described later. Therefore, if a biaxial acceleration sensor is used in this embodiment, a biaxial acceleration sensor detecting accelerations on X and Y axial directions may be applied.

Data indicating the acceleration detected by the acceleration sensor 60 is outputted to the communication unit 58. Note that for the acceleration sensor 60, an electrical capacitance type acceleration sensor can be typically used. The acceleration sensor 60 has a sampling period of about 200 frames/second at maximum, for example.

The communication unit 58 includes a microcomputer (micon) 62, a memory 64, a wireless module 66 and an antenna 68. The micon 62 controls the wireless module 66 for wirelessly transmitting obtained data while using the memory 64 as a storage area at the time of processing.

Data outputted from the operating portion 52 and the acceleration sensor 60 to the micon 62 is temporarily stored on the memory 64. Here, wireless transmission from the communication unit 58 to the receiving unit 18 is performed in the prescribed cycles. However, since processing of a game is typically performed by a 1/60 second unit, it is required to perform transmission in a shorter cycle. When transmission timing to the receiving unit 18 comes, the micon 62 outputs data stored on the memory 64 to the wireless module 66 as operation data. The wireless module 66 modulates carrier wave of a prescribed frequency with the operation data, and radiates the extremely low power radio wave signals from the antenna 68 by using a technique of the Bluetooth (registered trademark), for example. Namely, the operation data is modulated to the extremely low power radio wave signals by the wireless module 66 and transmitted from the controller 14. The extremely low power radio signals are received by the receiving unit 18 of the game apparatus 12 side. By demodulating or decoding the received extremely low power radio signals, the game apparatus 12 can obtain the operation data. The CPU 26 of the game apparatus 12 performs game processing based on the operation data obtained from the controller 14.

Note that the shape of the controller 14 and the shapes, numbers, arrangement positions and the like of the respective operation switches 52 shown in FIG. 3 are just examples, which can be modified appropriately to other shapes, numbers and arrangement positions.

By using the controller 14, the player can perform game operations such as moving the position of the controller 14 itself and rotating the controller 14, in addition to the conventional general game operations such as pressing respective operation switches.

In this embodiment, a game to be played by a rotating operation is executed. FIG. 5 shows the outline of a method of rotating operation. FIG. 5 shows a state of rotating operation of the controller 14 held by the right hand of the player, viewed from the right hand side of the player. The player holds the controller 14 in an almost horizontal state, that is, in a state where the Z axial direction is in a horizontal position. Then, the player rotates the arms such that the controller 14 moves around the axis 70 parallel to the Z axial direction, that is, rotationally moves around the axis 70. The axis 70 of the rotating operation is in parallel with the Z axial direction, that is, an axis having a direction orthogonal to the X and Y axes. As described above, rotating operation means an operation such that the controller 14 moves (rotationally moves) around the prescribed axis 70.

Since the human moves the arms, the controller 14 is not needed to perform a completely circular movement around the axis 70, and the Z axial direction of the controller 14 may be inclined somewhat from the horizontal direction. Further, in this embodiment, since a game assuming a horizontal handle is rotated on the screen is performed as described later, the player only holds the controller 14 in a horizontal state assuming it is the handle. In the case of a setting in which the axis 70 of the rotational movement is in a vertical direction in a game of another embodiment, the controller 14 is ideally held in a posture where the Z axial direction is in the vertical direction and rotated within the horizontal plane. In other words, in a setting where a state of rotating operation is detected by the accelerations on the two axes X and Y, the controller 14 is operated to rotate around the axis 70 parallel to the Z axial direction (that is, rotate within the XY plane).

When the rotating operation is performed, a centrifugal force is applied to the controller 14 in a vertical direction to the rotational axis 70 and an outward direction from the rotational axis 70, and thereby the acceleration is detected by the acceleration sensor 60. In this embodiment, since the rotating operation is an operation where the Z axial direction is set as the axis 70, the accelerations on the X and Y axes are detected by the centrifugal force. Since the operating state of the rotating operation is reflected on the accelerations on the two axes, in this embodiment, the accelerations on the X and Y axes are considered as inputs by the rotating operation, and the game processing is performed based on the inputs. In this embodiment, information expressing the rotational operating state more precisely is extracted from the detected accelerations on the two axes, and the game processing is performed based on the information so as to utilize the rotational operating state in the game processing more precisely.

Figure 6:
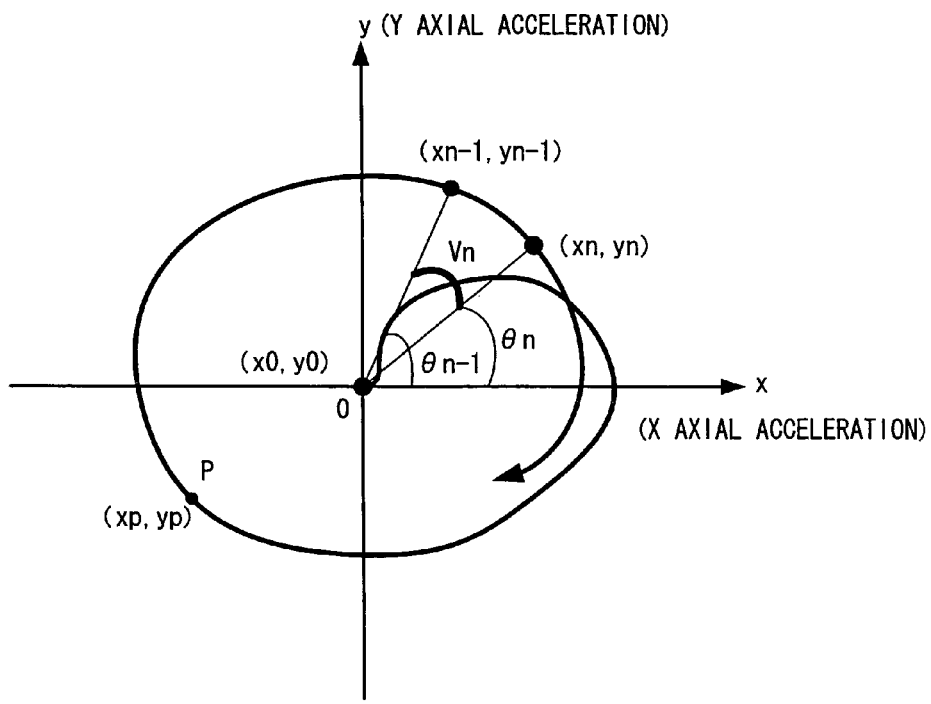
FIG. 6 is an illustrative view showing an outline of a method of calculating input data to be used in game processing from acceleration data detected by the rotating operation.

FIG. 6 shows the outline of a method of calculating input data used in the game processing from the acceleration data detected by the rotating operation. First, the detected accelerations on the two axes are converted into a point on a two-dimensional coordinate system. That is, in this embodiment, since the rotational operating state is reflected in the accelerations on the X axis and the Y axis, an xy coordinate system in which the X axial acceleration is set as a component of the x axis and the Y axial acceleration is set as a component of the y axis is defined, and the detected acceleration is converted to a point P (xp, yp) on the xy coordinate system.

Note that in this embodiment, since the rotating operation is performed in a state where the longitudinal direction of the controller 14 is in parallel with the horizontal direction, gravity acceleration (−1.0G) is added to the Y axial acceleration detected. Therefore, at the time of conversion, −0.1G is subtracted from the Y axial acceleration value. Until the rotating operation is performed, it is converted to a point (0,0).

The detected X axial acceleration and Y axial acceleration change corresponding to the rotating operation. As shown in FIG. 6, the history of the converted point P draws a locus starting from the origin O and rotating around the origin O. The locus of the rotational movement of the converted point can be considered to show the rotational operating state. Therefore, by calculating the angles of respective points, changes in the angles are further calculated.

The angle of each point means an angle defined by a line, connecting the fixed point (here, the origin) with each point, and the reference direction (here, x axis). In FIG. 6, the angle of a point (xn, yn) in the present frame (frame number n) is shown by θn, and the angle of a point in the previous frame (frame number n−1) is shown by θn−1. Therefore, the angle change Vn is calculated by subtracting θn−1 from θn. The angle change Vn is a moving amount or rotational amount in a certain period (1 frame) of the point P, that is, it shows the rotating velocity.

Further, it is determined whether or not the prescribed rotating operation is performed, and according to the determination result, the angle change is corrected. Specifically, it is determined whether or not the controller 14 has been stopped, and if the controller 14 has been stopped, the angle change is corrected to zero. Further, it is determined whether or not an abrupt change has been caused in the rotation, and in the case of an abrupt change, the angle change is corrected to zero. An abrupt change is shown by a difference in the angle change Vn. A difference in angle change is a change in velocity, so it indicates acceleration. Therefore, if there is a certain change or more in the rotating velocity, it is considered that an abnormality is caused in the rotating operation of the controller 14, so data of the angular change is invalidated. Further, it is determined whether or not it is a rotation in a constant direction, and if it is not a rotation in a constant direction, the angle change is corrected to zero. If there is an angle change exceeding a prescribed range in a prescribed time from the present to the past, it is considered as not a rotating operation of the same direction, so data of the angle change is invalidated. In this way, the game proceeds by not only simply performing rotating operation but also continuing the rotating operation in the same direction, enabling to further enhance the amusement of the game.

If it is determined as not a prescribed rotating operation, the angle change is set to zero. The angle change after correction is called "angle change in view of stop", shown by using a variable T. On the other hand, if it is determined that a prescribed rotating operation is performed, the calculated angle change Vn is directly set as an angle change T considering the stop.

Then, based on the angle change T in view of stop, a correction angle V as input data used for game processing is calculated. The correction angle V is calculated by applying two-stage correction.

First, an angle change T considering stop is corrected to a corrected angle change T' according to the following equation 1:

$$T=T'+(T-T'*\text{constant}) \qquad \text{[Equation 1]}$$

T' of the right-hand side is a corrected angle change T' calculated in the previous frame. For the constant, an appropriate value (a positive number smaller than 1) is selected. Note that the initial value of T' is 0.

T' is an angle change corrected such that T changes smoothly. Based on the corrected angle change T', the correction angle V is calculated according to the following equation 2.

$$V=V+T' \qquad \text{[Equation 2]}$$

V of the right-hand side is a correction angle V calculated in the previous frame.

In this way, the correction angle V in the present frame is calculated based on the angle change T' corrected to change smoothly and the correction angle V used in the game processing in the previous frame, without using the angle change Vn itself calculated in the present frame. Therefore, the correction angle V changes smoothly. By using such a correction angle V, the rotating operation state can be reflected on the game processing appropriately and smoothly. In other words, changes in the game processing can be made to conform to the rotational operating state smoothly, so it is possible to change the movement of the object smoothly, for example.

Figure 7:
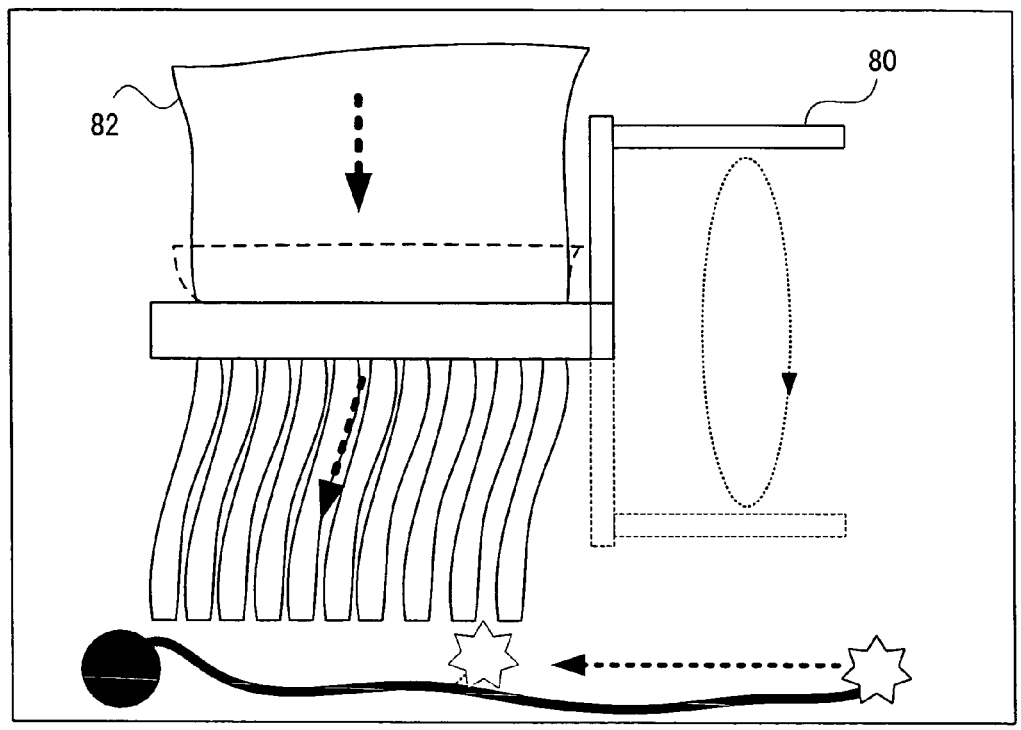
FIG. 7 is an illustrative view showing an example of a game screen.

As an example, a manual shredder game as shown in FIG. 7 is carried out. In this game, a player rotates a handle object 80 of a shredder by rotating operation so as to shred a paper object 82. A time limit is set, and the player must shred the paper object 82 of a prescribed length by rotating the handle object 80 for more than a prescribed number of times until the time limit exceeds. The time limit may be expressed in numbers, but in FIG. 7, the time limit is shown such that the length of a fuse wire is getting short as the time passes and a bomb explodes at the time limit. If shredding of paper is completed before the bomb explodes, the game is cleared.

The handle object 80 as an object to be operated is arranged horizontally such that the longitudinal direction thereof comes to the left and right direction of the screen. Therefore, in this game, the controller 14 is held such that the Z axial direction comes to the left and right direction of the player, as shown in FIG. 5. In playing the game, the player makes the handle object 80 and the controller 14 parallel to each other toward the screen. Then, the player moves the controller to rotate around the axis 70 parallel to the Z axial direction. According to the rotating operation, the handle object 80 rotates, and the paper object 82 moves from the top to the bottom and is shredded. In this way, the player can shred the paper on the screen by rotating the controller 14 toward the screen. By performing an unconventional operating method of rotationally operating the controller 14, the player can enjoy new sensory experience.

Figure 8:
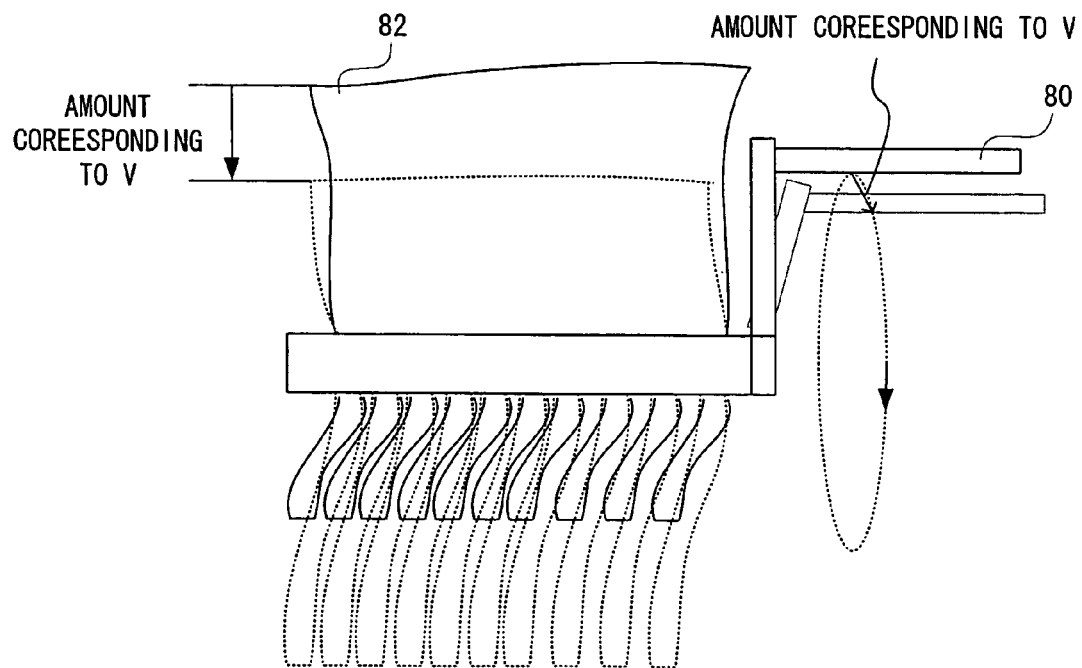
FIG. 8 is an illustrative view showing an example of an object controlled according to a correction angle.

Further, as shown in FIG. 8, the handle object 80 is rotated in the virtual game space for an amount corresponding to the correction angle V, and the paper object 82 is also shredded for a length corresponding to the correction angle V. In this way, operation of the game object is controlled according to the rotational operating state by the player, and the result is displayed on the screen. Therefore, it is possible to realize a game involving unconventional amusement, and to allow the player to enjoy unconventional operating feeling and game experience.

Figure 9:
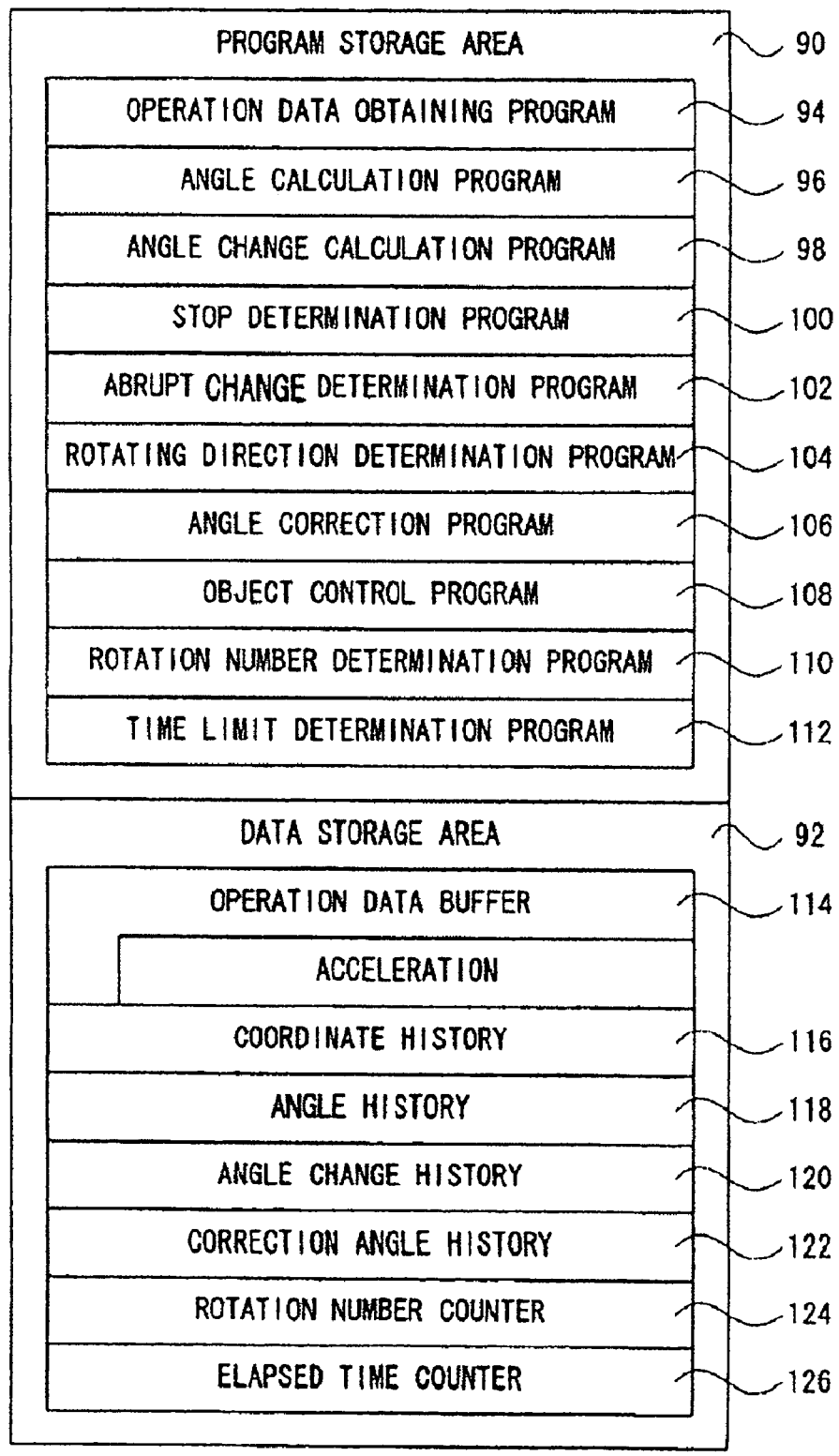
FIG. 9 is an illustrative view showing an example of a memory map.

FIG. 9 shows an example of a memory map. Then main memory 28 includes a program storage area 90 and the data storage area 92. Note that FIG. 9 shows a part of the memory map, and other programs and data required to proceed the game are read out from the optical disc 20 or the like or generated or obtained by the CPU, and stored on the main memory 28. Although an illustration is omitted, a program for generating the game screen, a program for controlling the screen display, a program for controlling sound output, image data, object data and the like are also stored.

On the storage area 94 of the program storage area 90, an operation data obtaining program is stored. Due to this program, operation data from the controller 14 is obtained in the main memory 28 via the receiving unit 18 and the controller I/F 38. As described above, the controller 14 transmits operation data in a shorter period than one frame (e.g., 1/60 second) in the game apparatus 12. Further, sampling period of the acceleration sensor 60 of the controller 14 is set to a shorter period than one frame (e.g., 1/200 second) in the game apparatus 12, and transmission data of one time of the controller 14 includes acceleration values at a plurality of detection timings. Therefore, in this embodiment, the game apparatus 12 can obtain operation data in which multiple pieces of operation information (acceleration values, etc.) are included in one frame. The CPU 26 can perform game processing by using the multiple pieces of operation information as required.

On the storing area 96, an angle calculation program is stored. With this program, an angle is calculated based on acceleration. Specifically, as shown in FIG. 6 described above, the X axial acceleration and the Y axial acceleration are converted to a point on the two-dimensional coordinate system, and an angle θ defined by a line, connecting the converted point with the original point, and the reference direction (x axis) is calculated. The game processing is performed by one frame, so an angle θ representing the frame is calculated. Further, as described above, since a plurality of acceleration values are detected and obtained in one frame of the game apparatus 12, it is possible to calculate an angle θ for each detected acceleration and to use it in the game processing. An angle θn of the n-th frame is an average value of the respective angles calculated from a plurality of acceleration values obtained in the n-th frame, for example. Alternatively, the maximum value or the minimum value may be adopted.

On the storage area 98, an angle change calculation program is stored. By calculating the difference between the angle θ of the present frame and the angle θn−1 of the previous frame, the angle change Vn is calculated.

On the storage area 100, a stop determination program is stored. With this program, it is determined whether or not rotating operation of the controller 14 has been stopped. For example, sampling data of a past prescribed number is referred from operation data buffer 114 described layer, and if the absolute values of X axial acceleration, Y axial acceleration and Z axial acceleration are within a prescribed range respectively, it is determined as stop. In this embodiment, acceleration values in the past eight detection timings for example, that is, acceleration values obtained during 2 to 3 frames from the present to the past, are referred to.

On the storage area 102, an abrupt change determination program is stored. With this program, it is determined whether or not there is an abrupt change in rotating operation. Specifically, a difference An between the angle change Vn calculated in the present frame and an angle change Vn−1 calculated in the previous frame is calculated, and if the difference An is out of a prescribed range, it is determined that an abrupt change is caused.

On the storage area 104, a rotating direction determination program is stored. With this program, rotating direction of the rotating operation is determined. Specifically, it is determined whether or not rotation is performed in the same direction for the past consecutive prescribed number of times, and if rotation is determined to be performed in the same direction, it is considered that rotation is performed in such a direction. The condition to be considered as being rotated in the same direction is that a difference between an angle θ at a detection timing and an angle θ at the detection timing immediately before is within a prescribed range. In this embodiment, for each of the angles calculated by converting the acceleration values (acceleration values obtained for 2 to 3 frames from present to the past) in the past eight detection timings, the difference between it and the angle of the detection timing immediately before is calculated, and it is determined whether or not all differences are within a prescribed range. As an example, if the difference is within 0 to 45 degrees, it is determined as a counterclockwise rotation in FIG. 6, and if the difference is within a range of −45 to 0 degree, it is determined as a clockwise rotation in FIG. 6.

On the storage area 106, an angle correction program is stored. With this program, a correction angle V used for game processing is calculated. Specifically, as shown in FIG. 6 described above, first, an angle change T in view of stop is calculated from the angle change Vn calculated by the angle change calculation program. That is, in the case where a prescribed rotating operation is performed, T is equal to Vn, and in another case, T is equal to 0. In this embodiment, conditions of a prescribed rotating operation are: the controller 14 has not been stopped; an abrupt change has not been made; and a rotating direction has not changed. Further, in this embodiment, a condition that a rotating direction is in a prescribed direction is also set. As shown in FIGS. 7 and 8, the handle object 80 of the shredder must be rotated downward on the depth side of the screen, which is a clockwise rotation in FIG. 6. Further, according to the Equation 1 mentioned above, the corrected angle change T' is calculated. Then, according to the Equation 2 mentioned above, the correction angle V is calculated based on the corrected angle change T and the correction angle V calculated in the previous frame. Note that the initial value of V is 0.

On the storage area 108, an object control program is stored. With this program, operation of the object is controlled based on the correction angle V. In this embodiment, as shown in FIG. 8 described above, rotation of the handle object 80 is controlled according to the correction angle V, and movement and shredding of the paper object 82 are controlled according to the correction angle V.

On the storage area 110, a rotation number determination program is stored. With this program, it is determined whether or not the rotation number of the rotating operation exceeds a prescribed threshold value. The rotation number is also the rotation number of a point that the acceleration value is converted, so the rotation number is calculated by counting one each time the sum of the correction angle V exceeds 360 degrees.

On the storage area 112, a time limit determination program is stored. With this program, it is determined whether or not the elapsed time from the start of the game is within a prescribed time limit. As described above, in this embodiment, a condition to clear the game is to complete shredding of the paper object 82 within the time limit, that is, to perform rotating operation for a prescribed number of times within the time limit, and whether the game clear condition is satisfied or not is determined by the rotation number determination program and the time limit determination program.

The storage area 114 of the data storage area 92 is an operation data buffer, in which operation data transmitted from the controller 14 is stored. The operation data includes acceleration data indicating the acceleration values of X, Y and Z axes detected by the acceleration sensor 60. Although not shown in FIG. 9, button operation data indicating whether each button of the operating portion 52 is operated or not is also included. As described above, since operation data including multiple pieces of operating information is received at least once from the controller 14 in one frame in the game apparatus 12, the received operation data is accumulated sequentially in the storage area 94. For example, 60 pieces of sampling data in the controller 14 are accumulated.

On the storage area 116, coordinate history is stored. With the angle calculation program described above, the X axial acceleration value and the Y axial acceleration value obtained from the operation data buffer 114 are converted to a point of two-dimensional coordinate system, so coordinates of the converted point are stored. For example, history of points of the number corresponding to 60 pieces of sampling data is stored.

On the storage area 118, angle history is stored. History of the angle θ of the point calculated by the angle calculation program described above is stored. For each frame, one angle θn representing the frame is stored. Further, each of the angles of multiple points obtained in each frame may also be stored.

On the storage area 120, angle change history is stored. History of the angle change Vn calculated by the angle change calculation program described above is stored. The angle change Vn of the present frame is calculated from the difference between the angle θn of the present frame (n-th frame) and the angle θn−1 of the previous frame (n−1-th frame).

On the storage area 122, correction angle history is stored. History of the correction angle V calculated by the correction angle calculation program described above is stored. When calculating the correction angle V of the present frame, the correction angle V of the previous frame stored on the storage area 122 is referred to.

On the storage area 124, a rotation number counter is stored. As described above, the rotation number is added by 1 each time the accumulated amount of the correction angle V exceeds 360 degrees.

On the storage area 126, an elapsed time counter is stored. Elapsed time is the number of elapsed frames for example, and the elapsed time is added by 1 for each frame.

Figure 10:
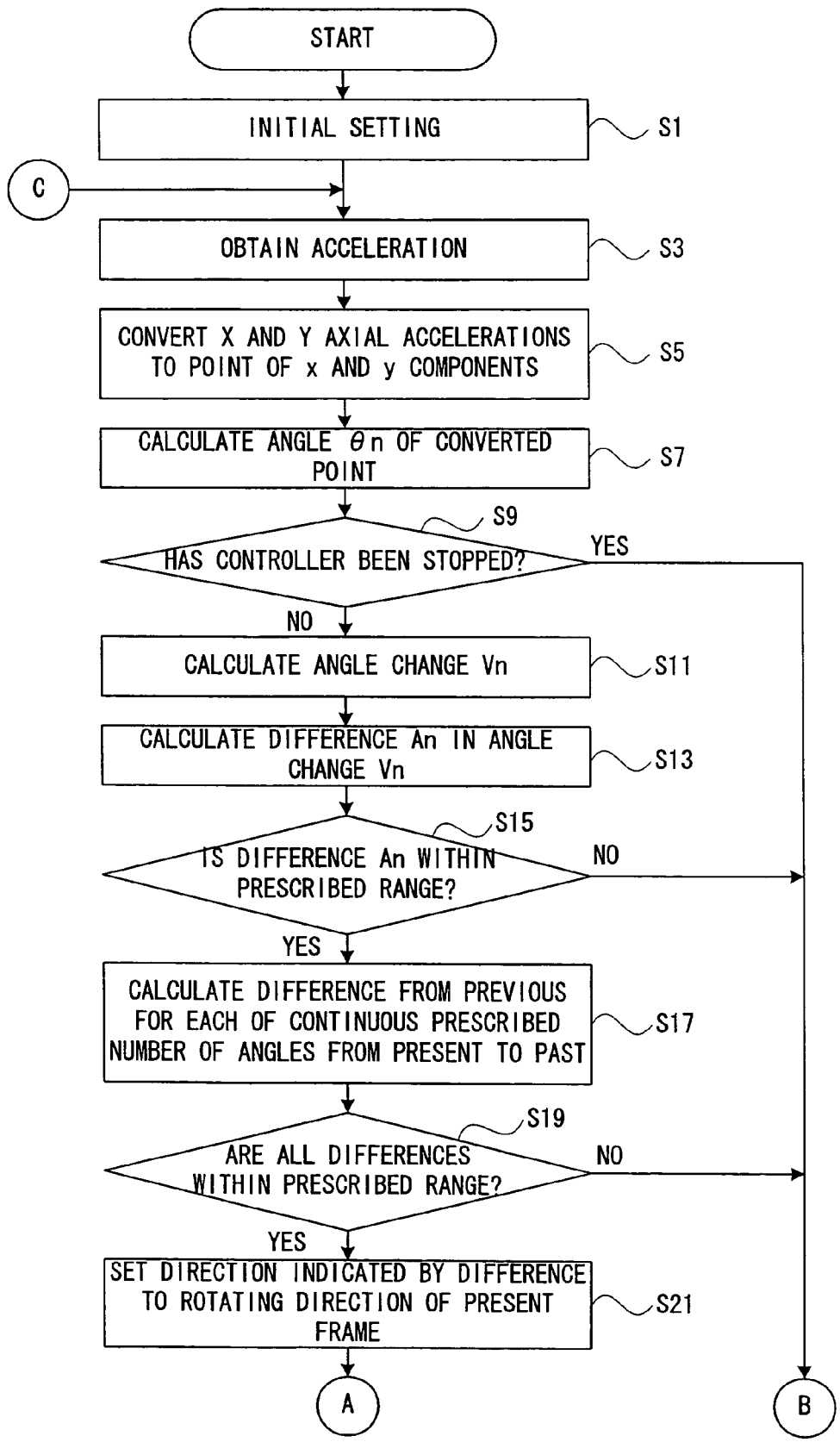
FIG. 10 is a flowchart showing a part of an exemplary operation of a game apparatus.

FIGS. 10 and 11 show an exemplary operation of the game apparatus 12. First, in a step S1, the CPU 26 performs initial setting. Specifically, the main memory 28 is cleared, and necessary programs and data are read out from the optical disc 20 to the main memory 28. Further, initial values are set to various variables and flags.

Processing in the following steps S3 to S41 is performed for each frame until game over or game clear is determined in a step S39 or S41. In the step S3, the CPU 26 obtains operation data in the operation data buffer 114 via the controller I/F 38, and obtains acceleration data in the present frame from the operation data.

Then, in a step S5, the CPU 26 converts the X axial acceleration and the Y axial acceleration into a point of xy coordinate system in which they are the x component and the y component, respectively (see FIG. 6). Since multiple pieces of acceleration data are obtained for each frame, a plurality of points are obtained through conversion. In this embodiment, the acceleration sensor 60 always detect gravity acceleration, and as shown in FIG. 5, since the controller 14 is assumed to be rotationally operated in a state where the Y axial positive direction is in a vertically upward direction, 1.0G is added to the detected Y axial acceleration. Coordinates of the respective converted points are stored on the coordinate history storage area 116.

In a step S7, the CPU 26 calculates the angle θn of the converted point. As described above, since accelerations are converted to a plurality of points for each frame, the angle θ of each point is calculated, and the angle θn representing the present frame is calculated by obtaining the average, the maximum or the minimum, for example. The calculated angles are stored on the angle history storage area 118.

In a step S9, it is determined whether or not the controller 14 has been stopped. For example, acceleration information of the past eight pieces are read out from the operation data buffer 114, and it is determined whether or not all of the absolute values of the X, Y and Z axial accelerations are values within prescribed ranges, respectively. If "YES" in the step S9, it is considered that the controller 14 has been stopped and a prescribed rotating operation has not been performed, so the process proceeds to a step S27 in FIG. 11.

On the other hand, if "NO" in the step S9, the CPU 26 calculates the angle change Vn by calculating the difference between the angle θn in the present frame and the angle θn−1 in the previous frame in a step S11. The calculated angle change Vn is stored on the angle change history storage area 120.

In the following step S13, the CPU 26 calculates the difference An of the angle change Vn based on the angle change Vn in the present frame and the angle change Vn−1 in the previous frame.

Then, in the step S15, the CPU 26 determines whether or not the difference An is within a prescribed range. That is, it is confirmed that no abrupt change is caused in the rotating operation in this step. If "NO" in the step S15, that is, if it is considered that an abrupt change is caused, a prescribed rotating operation is not performed, so the process proceeds to the step S27 in FIG. 11.

On the other hand, if "YES" in the step S15, the rotating direction is determined by the processing of the following steps S17 and S19. In the step S17, the CPU 26 calculates the difference from the angle corresponding to the sampling timing immediately before for each of the angles of the continuing prescribed number (e.g., angles corresponding to eight pieces of sampling timing) from the present to the past. Then, in the step S19, the CPU 26 determines whether or not all differences are within a prescribed range. That is, it is determined whether or not rotation in the same direction is performed continuously during the past prescribed time period.

If "NO" in the step S19, it is considered that rotating operation in a constant direction is not performed, so the process proceeds to the step S27 of FIG. 11.

On the other hand, if "YES" in the step S19, that is, in the case of a rotation in the same direction, the CPU 26 sets the direction indicated by the difference as the rotating direction of the present frame in a step S21. If the sign of the difference is positive, the rotating direction is a counterclockwise rotation in FIG. 6, and if the sign of the difference is negative, it is a clockwise rotation in FIG. 6. When the step S21 has been completed, the process proceeds to a step S23 in FIG. 11.

In the step S23 in FIG. 11, the CPU 26 determines whether or not the rotating direction is a prescribed direction. In the manual shredder game of this embodiment, only rotation in a prescribed direction is allowed, so this determination is performed. If "YES" in the step S23, the process proceeds to a step S25, and if "NO", the process proceeds to the step S27. Note that in another game, rotation in the both directions may be allowed, that is, determination in the step S23 may not be performed.

In the step S25, the CPU 26 sets the angle change Vn calculated in the present frame to the variable T indicating the angle change in view of stop. Thereby, an angle change due to rotating operation obtained in the present frame is reflected in the game processing of the present frame.

On the other hand, in the step S27, the CPU 26 sets zero to the variable T indicating the angle change in view of stop. That is, in the case where a prescribed rotating operation is not performed, an angle change due to the rotating operation obtained in the present frame is not considered in the game processing of the present frame.

Next, in a step S29, the CPU 26 calculates the correction angle V. Specifically, first, the corrected angle change T' is calculated based on the angle change T in view of stop and the corrected angle change T' of the previous frame, according to the Equation 1 mentioned above. Then, the correction angle V is calculated based on the corrected angle change T' and the correction angle V calculated in the previous frame. The correction angle V is calculated according to the above-mentioned Equation 2. The calculated correction angle V is stored on the correction angle history storage area 122 together with the corrected angle change T'.

Game processing according to the correction angle V is performed. That is, in a step S31, the CPU 26 moves the handle object 80 of the shredder and the paper object 82 by the amount corresponding to V respectively, as shown in FIG. 8.

Further, in a step S33, the CPU 26 calculates the rotation number, and stores it on the rotation number counter storage area 124. Specifically, the correction angles V are accumulated, and 1 is added to the rotation number for every 360 degrees.

Further, in a step S35, the CPU 26 counts the elapsed time, and stores it on the elapsed time counter storage area 126. For example, the number of frames elapsed from the start of the game is stored. Based on the information of the elapsed time counter storage area 126, an image (fuse of bomb in FIG. 7) showing the elapsed time or the remaining time is generated.

Then, in a step S37, the CPU 26 generates a game image reflecting the game processing result by using the GPU 32, and displays the screen as shown in FIG. 7 on the monitor 16.

Then, in the step S39, the CPU 26 determines whether or not the elapsed time is within the time limit. If "YES" in the step S39, the CPU 26 further determines whether or not the rotation number exceeds a prescribed threshold value in the step S41. If "NO" in the step S41, that is, if the game clear conditions are not satisfied, the process returns to the step S3 in FIG. 10 so as to continue the game.

On the other hand, if "YES" in the step S41, that is, if the game clear conditions are satisfied, the CPU 26 performs game clear processing in a step S43, and displays a screen indicating the game clear, for example. If "NO" in the step S39, that is, if the game-over conditions are satisfied, the CPU 26 performs game-over processing in a step S45, and displays the screen indicating game-over, for example. When the step S43 or S45 is completed, the game processing is completed.

According to this embodiment, biaxial acceleration detected by the acceleration sensor 60 provided in the controller 14 is converted to a point of two-dimensional coordinate system, and a correction angle is calculated from the angle change of the point to thereby perform game processing based on the correction angle. That is, by calculating the rotational angle of the point in which the detected accelerations on two axes serve as the components, the state of rotating operation of the controller 14 is detected and used in the game processing. Therefore, since game processing according to the rotating operation of the controller 14 can be performed, it is possible to realize a game having unconventional amusement. Further, since the game can be played by an unconventional operating method of rotating the controller 14, which gives a new sensory experience to the player.

Note that in the embodiment described above, a game is played by rotating operation to move around the axis 70 parallel to the Z axial direction of the controller 14 (acceleration sensor 60), as shown in FIG. 5, and acceleration caused due to the centrifugal force acted in the X and Y axial directions of the acceleration sensor 60 by the rotating operation is detected. However, the rotational operating method is not limited to this configuration. For example, a game requiring a rotating operation to move around an axis parallel to the Y axial direction may be carried out. In such a case, since it is a rotating operation within an XZ plane, accelerations in the X and Z axial directions are obtained and used in the game processing. Alternatively, a game may be one played by a rotating operation to move around an axis parallel to the X axial direction. In such a case, since it is a rotation within a YZ plane, accelerations in the Y and Z axial directions are obtained, and the game processing is carried out.

Although example embodiments of the present invention have been described and illustrated in detail, it is clearly understood that the same is by way of illustration and example only and is not to be taken by way of limitation, the spirit and scope of the present invention being limited only by the terms of the appended claims.

What is claimed is:

1. A non-transitory storage medium storing a program for performing processing, in an apparatus having an operation device including an acceleration sensor for detecting accelerations on at least two axes orthogonal to each other, according to a rotating operation to move said operation device around an axis orthogonal to said two axes, wherein
said program causes a processor of said apparatus to perform:
an obtaining step of obtaining the accelerations on the two axes detected by said acceleration sensor;
a conversion step of converting said accelerations on the two axes into a point on a two-dimensional coordinate system;
an angle calculation step of calculating an angle defined by a line connecting said point converted with a reference point, and a reference direction;
an angle change calculation step of calculating an angle change between a present angle calculated in said angle calculation step and a previous angle;
an angle correction step of calculating a correction angle based on the angle change calculated in said angle change calculation step and a previous correction angle; and
a processing step of performing processing based on the correction angle calculated in said angle correction step.

2. The non-transitory storage medium storing a program according to claim 1, wherein
said program further causes said processor to perform a rotating direction determination step of determining whether or not a rotating direction is the same as a past one based on the angle change calculated in said angle calculation step, and
if the rotating direction is determined as not the same one in said rotating direction determination step, the correction angle is calculated on a supposition that said angle change is zero in said angle correction step.

3. The non-transitory storage medium storing a program according to claim 1, wherein said processing step includes a display control step of displaying an object moved based on said correction angle on a display.

4. The non-transitory storage medium storing a program according to claim 1, wherein said processing step includes a clear determination step of determining whether or not a clear condition is satisfied based on said correction angle.

5. The non-transitory storage medium storing a program according to claim 4, wherein
said processing step includes a rotation number calculation step of calculating a rotation number of said rotating operation based on said correction angle, and
said clear determination step determines whether or not said rotation number reaches a prescribed threshold or more within a time limit, as said clear condition.

6. An apparatus for performing processing, having an operation device including an acceleration sensor for detecting accelerations on at least two axes orthogonal to each other, according to a rotating operation to move said operation device around an axis orthogonal to said two axes, comprising:
an obtaining programmed logic circuitry for obtaining the accelerations on the two axes detected by said acceleration sensor;
a conversion programmed logic circuitry for converting said accelerations on the two axes into a point on a two-dimensional coordinate system;
an angle calculation programmed logic circuitry for calculating an angle defined by a line connecting said point converted with a reference point, and a reference direction;
an angle change calculation programmed logic circuitry for calculating an angle change between a present angle calculated by said angle calculation programmed logic circuitry and a previous angle;
an angle correction programmed logic circuitry for calculating a correction angle based on the angle change calculated by said angle change calculation programmed logic circuitry and a previous correction angle; and
a processor for performing processing based on the calculated correction angle.

7. The apparatus according to claim 6, wherein
said processor has configuration to determine whether or not a rotating direction is the same as a past one based on the calculated angle change, and
if the rotating direction is determined as not the same one in said rotating direction determination, the correction angle is calculated on a supposition that said angle change is zero in said angle correction calculation.

8. The apparatus according to claim 6, wherein said processor has a configuration to display an object moving based on said correction angle on a display.

9. The apparatus according to claim 6, wherein said processor has configuration to determine whether or not a clear condition is satisfied based on said correction angle.

10. The apparatus according to claim 9, wherein
said processor has configuration to calculate a rotation number of said rotating operation based on said correction angle, and
said determining whether or not a clear condition is satisfied includes determining whether or not said rotation number reaches a prescribed threshold or more within a time limit, as said clear condition.

11. An control method for performing processing, in an apparatus having an operation device including an acceleration sensor for detecting accelerations on at least two axes orthogonal to each other, according to a rotating operation to move said operation device around an axis orthogonal to said two axes, including:
obtaining the accelerations on the two axes detected by said acceleration sensor;
converting said accelerations on the two axes into a point on a two-dimensional coordinate system;
calculating an angle defined by a line connecting said point converted with a reference point, and a reference direction;
calculating an angle change between a present angle calculated in said angle calculating and a previous angle;
calculating a correction angle based on the angle change calculated in said angle change calculating and a previous correction angle; and
performing processing based on the calculated correction angle.

12. The control method according to claim 11, further comprising:
determining whether or not a rotating direction is the same as a past one based on the calculated angle change, and
if the rotating direction is determined as not the same one in said rotating direction determining, the correction angle is calculated on a supposition that said angle change is zero in said angle correction calculating.

13. The control method according to claim 11, further comprising displaying an object as having moved based on said correction angle on a display.

14. The control method according to claim 11, further comprising determining whether or not a clear condition is satisfied based on said correction angle.

15. The control method according to claim 14, further comprising:
calculating a rotation number of said rotating operation based on said correction angle, and
determining whether or not said rotation number reaches a prescribed threshold or more within a time limit, as said clear condition.

16. A system for performing processing, in an apparatus having an operation device including an acceleration sensor for detecting accelerations on at least two axes orthogonal to each other, according to a rotating operation to move said operation device around an axis orthogonal to said two axes, comprising:
an input configured to receive data representing accelerations on at least two axes orthogonal to each other detected by an acceleration sensor according to a rotating movement around an axis orthogonal to said two axes;
a computer system, having one or more processor, configured to:
convert said data representing accelerations on the two axes into a point on a two-dimensional coordinate system;
calculate an angle defined by a line connecting said converted point with a reference point, and a reference direction;
calculate an angle change between a present angle calculated in the angle calculation and a previous angle;
calculate a correction angle based on the calculated angle change and a previous correction angle; and
perform processing based on the calculated correction angle.

17. The system according to claim 16, wherein the computer system is further configured to:
determine whether or not a rotating direction is the same as a past one based on the calculated angle change, and
if the rotating direction is determined as not the same one, the correction angle is calculated on a supposition that said angle change is zero in the angle correction calculating.

18. The system according to claim 16, wherein the computer system is further configured to generate a display of an object as having moved based on said correction angle.

19. The system according to claim 16, wherein the computer system is further configured to determine whether or not a clear condition is satisfied based on said correction angle.

20. The system according to claim 19, wherein the computer system is further configured to calculate a rotation number of said rotating operation based on said correction angle, and determine whether or not said rotation number reaches a prescribed threshold or more within a time limit, as said clear condition.

* * * * *